US010427477B2

(12) United States Patent
Schmid

(10) Patent No.: US 10,427,477 B2
(45) Date of Patent: Oct. 1, 2019

(54) CHAIN FOR MOUNTING ON A VEHICLE TIRE

(71) Applicant: pewag Schneeketten GmbH, Graz (AT)

(72) Inventor: Karl Schmid, Köflach (AT)

(73) Assignee: pewag Schneeketten GmbH (AT)

(*) Notice: Subject to any disclaimer, the term of this patent is extended or adjusted under 35 U.S.C. 154(b) by 171 days.

(21) Appl. No.: 15/490,364

(22) Filed: Apr. 18, 2017

(65) Prior Publication Data

US 2017/0297389 A1  Oct. 19, 2017

(30) Foreign Application Priority Data

Apr. 19, 2016 (AT) ............................... A 50348/2016

(51) Int. Cl.
*B60C 27/06* (2006.01)
*B60C 27/08* (2006.01)

(52) U.S. Cl.
CPC ............ *B60C 27/067* (2013.01); *B60C 27/08* (2013.01); *B60C 27/083* (2013.01); *B60C 27/086* (2013.01)

(58) Field of Classification Search
CPC ..... B60C 27/067; B60C 27/08; B60C 27/083; B60C 27/086
See application file for complete search history.

(56) References Cited

U.S. PATENT DOCUMENTS 1,219,088 A * 3/1917 Davis ...................... B60C 27/08
152/239
1,565,497 A * 12/1925 Rankin .................. B60C 27/08
152/239
1,814,716 A * 7/1931 Lewis ..................... B60C 27/08
152/245
1,985,444 A * 12/1934 Davis ..................... B60C 27/08
152/245
2,050,278 A * 8/1936 Cull ........................ B60C 27/08
152/245

(Continued)

FOREIGN PATENT DOCUMENTS

AT        7811 U1      9/2005
DE    3615734 A1 *  11/1987  ............. B65G 19/20

(Continued)

OTHER PUBLICATIONS

Austrian Office Action dated Nov. 3, 2016 for AT Application No. A50348/2016 (with English Language Machine Translation).

*Primary Examiner* — Kip T Kotter

(74) *Attorney, Agent, or Firm* — Design IP

(57) ABSTRACT

A chain for mounting on a vehicle tire, in particular a sliding block chain, having a chain mesh, which is disposed at least on the tread of a vehicle tire in the mounted state of the chain and has a number of chain strands, each of which is formed by a number of chain links each with essentially straight longitudinal legs which run parallel to one another and are connected to one another at their ends by connecting elements in particular connecting rings. In the mounted state of the chain, the chain links of the chain strands lie on the tread at alternately positive and negative angles with respect to the tread. Wear elements are provided, realized as wear webs, which are fixedly connected to chain links of the chain mesh and which extend parallel to the longitudinal legs of the chain links.

16 Claims, 3 Drawing Sheets

(56) References Cited

U.S. PATENT DOCUMENTS

| | | | |
|---|---|---|---|
| 2,149,342 A | | 3/1939 | Hodell |
| 2,165,114 A | * | 7/1939 | Senft ................. B60C 27/08 152/245 |
| 4,361,178 A | * | 11/1982 | Gower ................ B60C 27/086 152/172 |
| 4,403,639 A | * | 9/1983 | Holte .................. B60C 27/08 148/211 |
| 5,423,365 A | * | 6/1995 | Labonville ........... B60C 27/08 152/239 |
| 8,234,852 B2 | * | 8/2012 | Pengg .................. F16G 13/12 152/239 |
| 2010/0078108 A1 | * | 4/2010 | Pengg .................. B60C 27/08 152/243 |
| 2013/0312884 A1 | * | 11/2013 | Schmid ................ B60C 27/086 152/208 |

FOREIGN PATENT DOCUMENTS

| | | | | |
|---|---|---|---|---|
| DE | 202016101308 U1 | * | 6/2017 | ............ B60C 27/06 |
| EP | 88043 A1 | | 9/1983 | |
| EP | 93688 A2 | | 11/1983 | |
| EP | 2258566 A1 | | 12/2010 | |

* cited by examiner

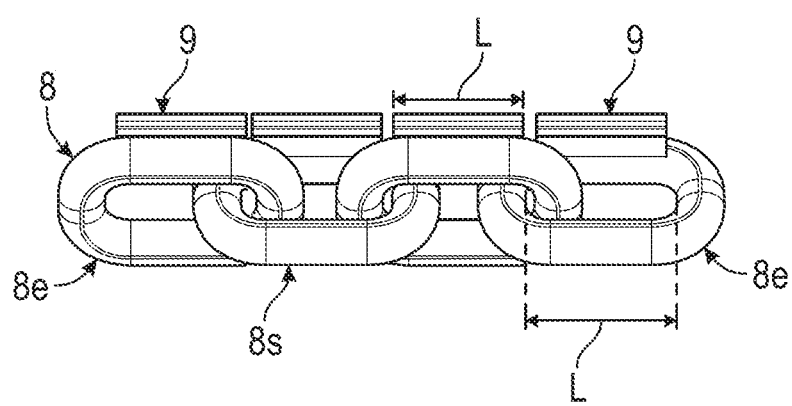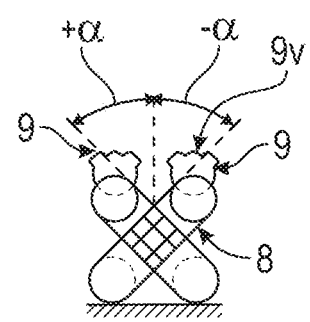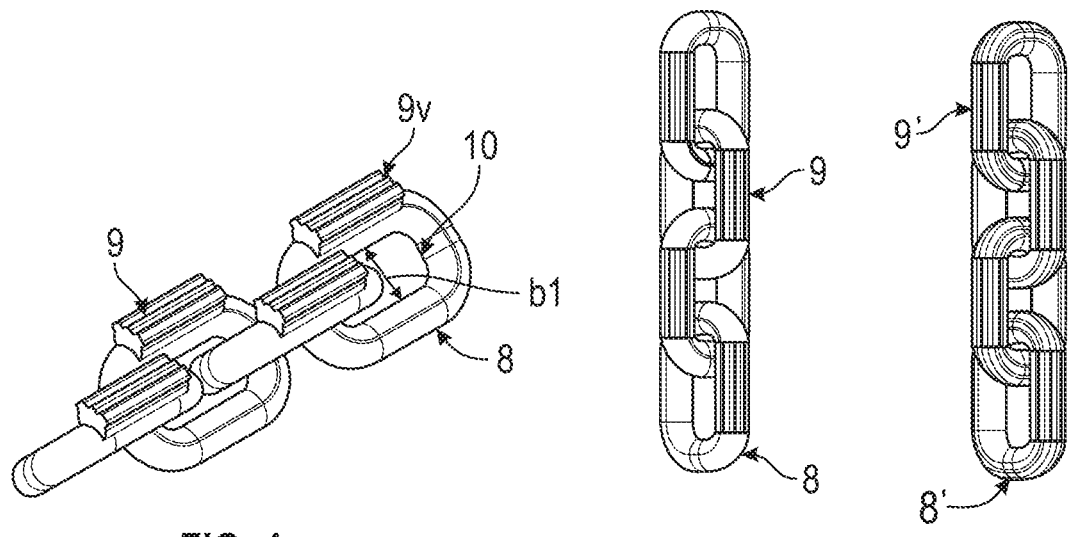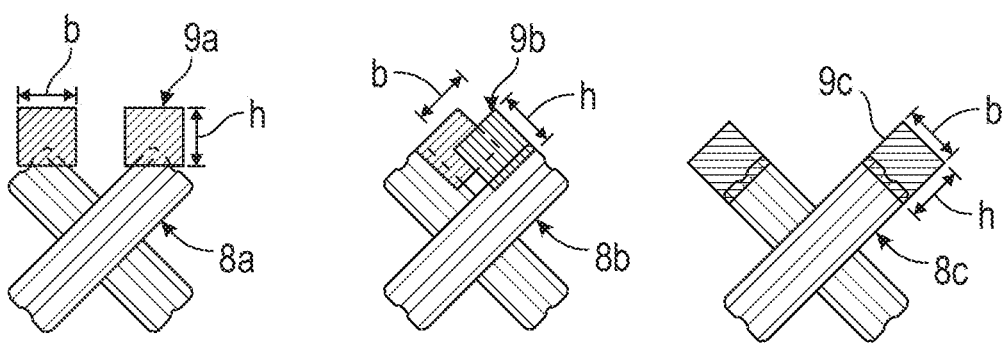

CHAIN FOR MOUNTING ON A VEHICLE TIRE

BACKGROUND OF THE INVENTION

The invention relates to a chain for mounting on a vehicle tire, in particular a sliding block (anti-skid) chain, having a chain mesh which in the installed state of the chain is arranged at least on the tread of a vehicle tire and has a number of chain strands, each being formed from a number of chain links, each link having essentially straight longitudinal legs parallel to one another and being connected to one another at their ends by connecting elements, in particular connecting rings, and the chain links of the chain strands in the mounted state of the chain or placed on the tread in alternating positive and negative angles with respect to the tread, wherein wear elements are provided on chain links.

SUMMARY OF THE INVENTION

With the chains according to the invention, which are used as tire chains or sliding block chains in particular, the chain mesh may be designed as a chain mesh as a whole or only in parts. Chains of this type are known from the prior art. For example, AT 511 844 B1 by the present applicant describes a chain in which the tread mesh is designed as a chain mesh as a whole, wherein the chain links of the chain strands stand on the tread in alternation or are oriented above the tread.

With this traditional arrangement, mainly the upright links are responsible for the transfer of force to the substrate and are also responsible for the traction. Therefore, these upright links are the first to show signs of wear during use, so that the lifetime of a chain is determined by that of the upright chain links, while the horizontal chain links are subject to very little wear. The horizontal chain links are links that have any wear function.

In this regard, an improvement is achieved in the use of a tire chain of the type defined in the introduction because there is a more uniform distribution of wear, and additional wear elements can increase the lifetime of the chain. DE 856107 C describes such a chain, in which the chain links lying horizontally in the area of the tread each carry a freely rotatable wear ring. Apart from the complicated manufacture of such a chain, the gripping effect is very low because the contact of the wear rings is theoretically only in points, in particular in the case of a solid and smooth road surface.

One object of the present invention is to eliminate these disadvantages.

This object is achieved by a chain of the type defined in the introduction, with which the wear elements according to the invention are realized as wear webs, which are fixedly connected to the chain links of the chain mesh and extend in parallel to the longitudinal legs of the chain links.

Thanks to the present invention, a tire chain having excellent traction and good wear properties is obtained, wherein the weight can be kept lower than is the case with chains of the traditional design having comparable wear and traction properties.

The traction can be further improved if the wear webs each have a profiled wear surface.

It is particularly advantageous here if the wear surface of the wear webs has a grooved profile with recesses and elevations extending parallel to the respective longitudinal leg.

It is provided in one embodiment that has proven success in practice that the wear webs extend essentially perpendicular to the tread in the direction of the height.

In addition, it has proven to be advisable if the wear webs have a length corresponding essentially to the length of the longitudinal legs of the chain links.

It is also expedient if the wear webs have a width corresponding at least essentially to the width dimension of the longitudinal legs of the chain links.

Although not necessarily required, it is nevertheless advisable in many cases if the wear webs are made of a material that has greater wear resistance than the material of the chain links.

With regard to economical production, it is also advantageous if the wear webs are welded onto the chain links.

In a preferred specific embodiment of the invention, it is possible to provide that the number of chain links in the chain strands is an even number, in particular two, four or six. As a result of the even number of chain links, which are oriented transversely to one another, preferably orthogonally, and therefore the end links of the chain strands are oriented transversely to one another, preferably orthogonally, this "automatically" results in an oblique position of the chain links.

To permit a particularly simple connection of the chain strands to the connecting rings, in a favorable embodiment of the invention, it may be provided that at least the chain links at the ends of the chain strands have an interior opening in which a ring strand of the connecting element, in particular the connecting ring, can be accommodated at an acute angle to the main plane of the respective chain link. The acute angle may preferably have a value of 45 degrees±15 degrees. The precise value of the angle is obtained from the inside clearance of the chain link and the thickness of the ring.

In a subsequent advantageous specific embodiment of the present invention, the connecting elements may be designed as connecting rings which are oriented essentially with their main plane parallel to the tread in the mounted stated of the chain, wherein the ring strand is cropped with respect to the main plane of the ring wherein the extent of the cropping can be predefined. The cropped connecting rings allow targeted support and/or stabilization of the oblique position of the end links and thus also the intermediate links of the chain. Due to careful dimensioning of the connecting rings in combination with the chain links, dimensionally stable oblique positions of the chain links can be predetermined in a targeted manner.

According to one further embodiment of this idea, in an advantageous embodiment of the invention, it is possible to provide that the connecting elements are designed as connecting rings, wherein in the case of at least some of the connecting rings the ring strand has an oval shape, preferably an elliptical section with one side of its cross section facing a central axis.

Since the tire shoulders also come in contact with the road in many driving situations, it may be advantageous if at least the first chain link connected to a connecting ring of a shoulder chain section has a wear web.

BRIEF DESCRIPTION OF THE DRAWINGS

The invention as well as additional details and advantages are explained in greater detail below on the basis of a nonrestrictive embodiment, which is illustrated in the drawings, which show schematically:

FIG. 1a in a detail of FIG. 1 on an enlarged scale: a section of the tire chain, but now with the wear webs drawn in;

FIG. 2: a four-link chain strand of the tire chain in a perspective view;

FIG. 3: the chain strand of FIG. 2 in a longitudinal view;

FIGS. 4 and 5: two views of the chain strand from FIG. 4 from other angles of view;

FIG. 6: a chain strand of a modified embodiment in a view according to FIG. 5;

FIGS. 7a to 7c: three embodiments with different positions of the wear webs with respect to the chain links;

DETAILED DESCRIPTION OF THE PREFERRED EMBODIMENTS

Figure 1:
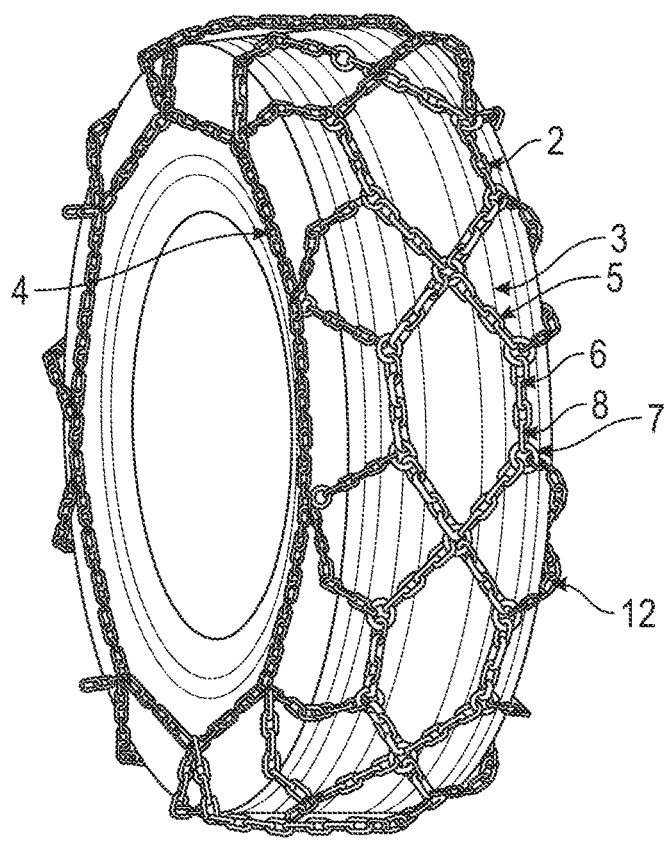
FIG. 1: an embodiment of a tire chain according to the invention in the installed state in a perspective view but without the wear webs in order to simplify the diagram.

In the figures, for reasons of simplicity the same elements have been provided with the same reference numerals.

FIG. 1 shows a tire chain according to one embodiment of the invention in the state in which it is mounted on a vehicle tire. FIG. 1 should show the chain in general, but the wear links which are essential to the invention and are described further below have not been shown in FIG. 1 for the sake of simplicity, but they can be seen in FIG. 1a and additional figures.

The chain 1 has a chain mesh in the form of a chain mesh 2 which runs over the tread 3 of the tire and to some extent also over the shoulders of the tire and is held on both sides of the tire by one tension strand each, in this case a tension chain 4 in the form in which it is stretched over the tread (only one of the two tension strands 4 is visible in FIG. 1; the other one lies similarly on the opposite side). The chain mesh is formed by a number of chain strands 5, 6 which are connected to one another by connecting rings 7. The chain strands 5, 6 may have the same number or a different number of chain links 8, depending on the design of the chain 1. In the case of the tire chain 1 shown here, both types of chain strands have four chain links 8 each. The shoulder chain strands are provided with the reference numeral 12.

FIG. 2 shows a chain strand 5 wherein an even number of chain links 8 is preferred because due to the two connecting rings 7 with a matching orientation at the end of the chain strand, the result is necessarily a positioning of the chain links in an oblique position, in particular inclined by an angle of essentially 45 degrees. This is due to the fact that the two end links 8a, 8b are oriented transversely to one another as a result of the even number of chain links (cf. FIG. 3) and thus a position in which the two end links run orthogonally through the rings 7 is impossible. Therefore this "automatically" results in an oblique position of the chain links 8. The angle is generally an acute angle with respect to the upright position wherein the exact value of the angle is obtained from the internal width of the chain link and the thickness of the connecting ring.

The chain links 8 have a shape which is preferably ellipsoidal, as shown in the figures, with parallel legs 8s which are connected to one another by bows 8b at the ends.

FIG. 3 shows the chain strand 5 in a longitudinal view, i.e., along the direction of travel of the chain strand, wherein for simplification the chain strand is shown in a stretched form. A curvature according to the circumferential curvature of the chain mesh 3 is not taken into account for the sake of simplicity. The two chain links 8 that are shown here are at a right angle to one another but are inclined by an angle of $\alpha=45$ degrees to the chain mesh 3, on which they sit with one longitudinal edge each, namely alternating by $+\alpha$ and $-\alpha$. This angle is measured at the location of the respective chain link, with respect to the normal to the tread, which is the axis perpendicular to the tread. In general, the angle $\alpha$ may also assume values other than 45 degrees, with angle values of 30 degrees to 60 degrees (therefore 45 degrees±15 degrees) being advantageous in particular. The angle selected in the individual case is obtained from the load situation typically intended for the sliding block chain. The successive chain links are then inclined by an angle $2\alpha$ to one another (instead of 90 degrees).

One can now see in FIGS. 1, 1a, 2 and 3 as well as the following figures that the chain links 8 of the chain mesh are provided with wear webs 9 in the area of the tread, each of the wear webs being fixedly connected to the chain links 8 and extending parallel to the longitudinal legs 8s of the chain links. The wear webs 9 are expediently welded to the chain links 8 and may also consist of a more wear-resistant material than the usual chain links. To name only one example, the chain links 8 may be made of a manganese-boron steel (K2), and the wear webs may be made of a manganese chromium steel (20MnCr5). On the other hand, the chain links 8 and the wear webs 9 can be produced from the same material.

The wear surface 9v may be profiled to improve the grip capability. In particular the wear surface 9v may have a grooved profile with recesses and elevations extending parallel to the respective longitudinal legs of the chain link 8, as shown in FIGS. 2 to 6, but FIGS. 4 and 5 show the chain strand of FIG. 2 but from different directions of view.

The chain links 8 of the embodiments according to FIGS. 2 to 5 are chain links with an essentially smooth surface, whereas in the embodiment according to FIG. 6, the chain links 8' have a corrugated profile, so that the surface and the hardness volume can be increased.

To obtain maximum traction with the chain, it is generally expedient if the wear webs 9 extend essentially perpendicular to the tread 3 in the direction of their height h, as can be seen in FIGS. 3 and 7a in particular. In this case, the height h of the wear webs 9a forms an angle of 45 degrees to the longitudinal extent of the chain links 8a.

On the other hand, it can be seen in FIGS. 7b and 7c that other positions of the wear webs 9 with respect to the chain links 8 are also possible and are expedient in certain applications and/or certain road conditions. The height h of the wear webs 9b in FIG. 7b is perpendicular to the longitudinal extent of the chain links 8b, whereas in FIG. 7c, the height h of the wear webs 9c runs in the direction of the longitudinal extent of the chain links 8c.

Expediently, but not necessarily, the length l of the wear webs 9 corresponds essentially to the length L of the longitudinal leg 8s of the chain links 8, as shown in FIG. 2, whereas the wear webs 9 preferably have a width b, which corresponds essentially to the width dimension B of the longitudinal legs of the chain links 8, as shown in FIG. 7a. However, in many cases, it may also be expedient to design the wear webs 9 to be wider than the longitudinal legs of the chain links 8.

Figure 1A:
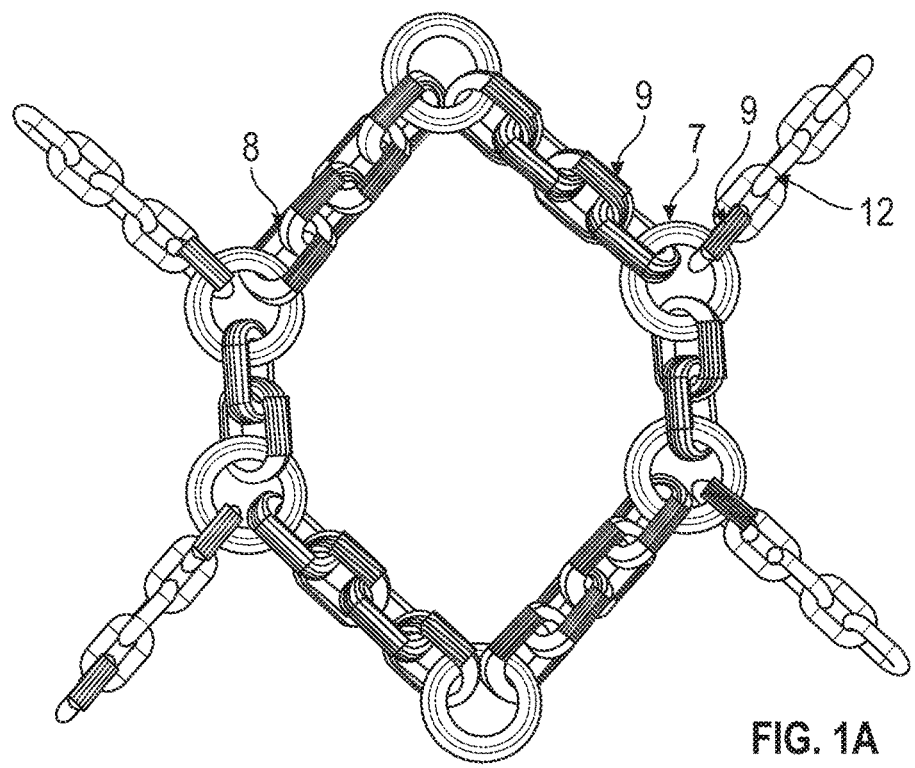

It is also worth mentioning that links of the shoulder chain sections 12 may advantageously also be provided with wear webs 9 wherein the first chain link of a section 12 connected to a connecting ring in particular has a wear web 9, as shown in FIG. 1*a*.

The shoulder chain links of the sections 12 have a cross section that is usually round and have a smaller internal width than the links on the tread, so that their application dimension is smaller and the cross section is also reduced. Therefore, the total weight of the chain can be reduced, the tires are protected on the flanks and the at least one wear link yields better traction. Because of the smaller cross sections of the internal and external side chains and/or tension chains, the weight of the entire chain is also reduced. Direct welding of the wear webs onto the chain links also yields weight savings in comparison with traditional chains, with which the wear webs must be welded onto horizontal links with the help of pressure links.

Figure 8A:
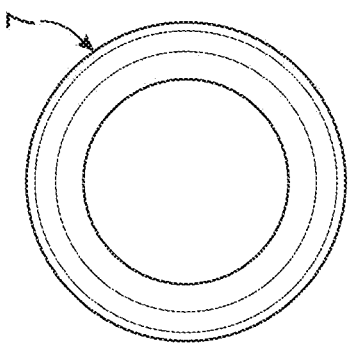
FIGS. 8a to 8c: the connecting ring of the tire chain in a view from above (FIG. 4a) in a sectional side view and in a perspective view.
Figure 8B:
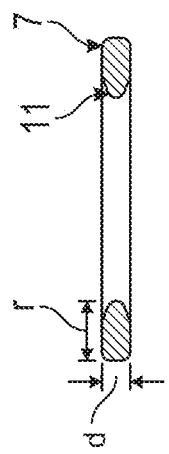
Figure 8C:
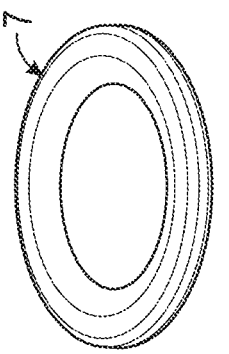

FIGS. 8*a*, 8*b* and 8*c* show a connecting ring 7 in a view from above, in a side view in cross section and in a perspective view. The ring 7 advantageously has a flattened shape which is inserted into the internal chain rounding 10 if possible (see FIG. 4) in an inclined position. To achieve the required cross-sectional area of the ring strand, the radial diameter of the ring strand is increased accordingly. As shown in FIG. 8*b* in particular, this yields a cross section of the ring strand having a thickness d and a radial dimension ("width") r, wherein the width advantageously amounts to at least twice the thickness d. The side 11 of the cross section facing the central axis m preferably has an oval shape, for example, according to a (half) ellipse (corresponding to a section of an ellipse). With this shape, the connecting ring may conform to the shape of the internal rounding 10, which is formed by the inclined chain link, and thus the orientation of the chain strand may be additionally stabilized by means of the chain link.

The ratio between the thickness d and the width r of the ring 7 is determined essentially by the cross section of the strand, which is required by the ring due to the force that must be applied. The ring 7 has a smaller thickness in comparison with a "normal" ring in order to have room in the oblique chain link. This would mean a loss of elastic modulus, which is compensated by a corresponding increase in the width.

An advantageous design of the width r of a connecting ring is also obtained due to the fact that it is larger than the internal width $b_I$ of the chain links 8 (see FIG. 4) which are bound to this connecting ring (suspended on it). This prevents the connecting ring from tilting with respect to the chain link, in particular preventing angling with respect to the longitudinal axis of the chain strand, so that the connecting ring remains in the intended position and cannot twist, and this rules out the risk that the ring might twist or bend and thereby assume a position from which it would be difficult to return to the starting position. This would be a problem in particular in assembly/dismantling of the tire chain and could also result in chain parts becoming wedged one inside the other (entangling).

Figure 9A:
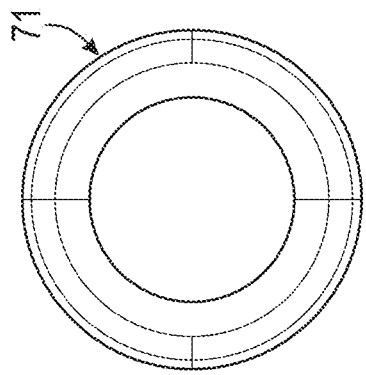
FIGS. 9a to 9c: an alternative embodiment of the connecting ring of the tire chain in a view from above, in a side view and in a perspective view.
Figure 9B:
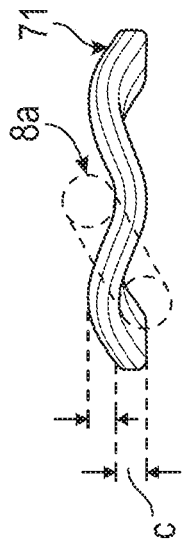
Figure 9C:
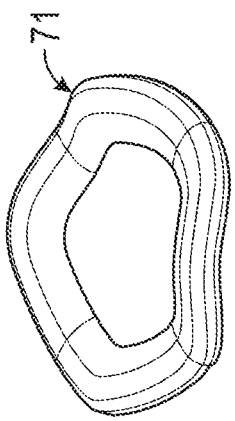

FIGS. 9*a*, 9*b* and 9*c* each show a variant of a connecting ring 71 having a cropped or wavy shape. The cropping facilitates an alignment in the desired oblique position and results in a greater dimensional stability. Here again the cross-sectional shape of the ring strand is preferably flattened with respect to the thickness. In addition the ring 71 is cropped, i.e., alternately deflected by a crop width c in comparison with an imaginary plane. In the drawing, the total crop lift is assigned a dimension of 2c. The crop lift is selected so that it ensures a stable positional relationship with an oblique position of the chain link 8*a* according to the angle α. The ring 71 is cropped three times over its total circumference and thus allows the ends of three chain strands to be linked according to the invention.

For a chain link 8*a*, 8*b* having a circular strand cross section with a radius a and the internal width $b_I$ this thus yields the ideal value of the cropping as $2c=2a+d-(b_I+2a) \cos \alpha$, where a denotes the radius of the cross section of a chain link 8, $b_I$ denotes the internal width of the chain link 8*a*, d denotes the thickness of the ring 71, and the angle α is the angle of inclination with respect to the upright position (i.e., standing on the tread).

Figure 10A:
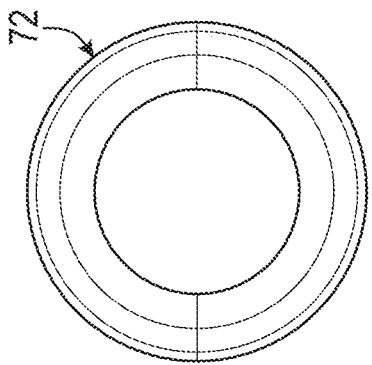
FIGS. 10a, 10b and 10c: another alternative embodiment of the connecting ring of the tire chain in a view from above, in a side view and in a perspective view.
Figure 10B:
Figure 10C:
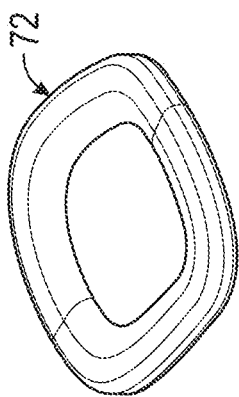

FIGS. 10*a* to 10*c* show another variant of a connecting ring 72, wherein this ring 72 has a four-fold cropping. Thus, this ring is especially suitable for linking four chain strands at their ends. For the dimensioning of the cropping, what was said above applies accordingly.

The skilled person will of course be in a position to modify the invention in view of the specification as well as the specific embodiments presented here and to adapt it to the given requirements. The technical design of the invention is therefore not limited to the specific embodiments presented here.

The invention claimed is:

1. A chain comprising a sliding block chain for mounting on a vehicle tire, wherein the chain comprises a chain mesh which is disposed on at least a tread of the vehicle tire in a mounted state of the chain, wherein the chain mesh comprises a plurality of chain strands, wherein each chain strand of the plurality of chain strands comprises a plurality of chain links, wherein each chain link of the plurality of chain links comprises two essentially straight longitudinal legs disposed parallel to one another, wherein each chain strand of the plurality of chain strands comprises a first strand end link and a second strand end link, wherein each of the first and second strand end links are connected to one of the first and second strand end links of another of the plurality of chain strands by a connecting ring, the connecting ring having a width that is larger than an internal width of each of the first and second strand end links, thereby preventing the connecting ring from tilting relative to the first and second strand end links, wherein each chain link of the plurality of chain links is positioned obliquely in the mounted state of the chain positioned on the tread at alternately positive and negative angles with respect to the tread, wherein at least one chain link of the plurality of chain links is provided with wear elements, wherein each wear element comprises a wear web, wherein the wear web is fixedly connected to each chain link of the plurality of chain links, and wherein the wear web extends parallel to the longitudinal legs of the chain links, and wherein the width of the connecting ring consists of a radial distance between an outer perimeter of the connecting ring and an inner perimeter of the connecting ring.

2. The chain according to claim 1, wherein the wear web comprises a profiled wear surface.

3. The chain according to claim 2, wherein the profiled wear surface-comprises a grooved profile, wherein the grooved profile comprises recesses and elevations extending parallel to the respective longitudinal leg.

4. The chain according to claim 1, wherein the wear web extends essentially perpendicular to the tread.

5. The chain according to claim 1, wherein the wear web comprises a first length, the longitudinal legs of the chain links comprise a second length and the first and second lengths are substantially equal.

6. The chain according to claim 1, wherein the wear web comprises a first width and the longitudinal legs of the chain links comprise a second width, wherein the first width is equal to or greater than the second width.

7. The chain according to claim 1, wherein the wear web is constructed of a material that has greater wear resistance than the material of the chain links.

8. The chain according to claim 1, wherein the wear web is welded to the chain link.

9. The chain according to claim 1, wherein each chain strand of the plurality of chain strands comprises an even number of chain links.

10. The chain according to claim 9, wherein each chain strand of the plurality of chain strands comprises two chain links.

11. The chain according to claim 9, wherein each chain strand of the plurality of chain strands comprises four chain links.

12. The chain according to claim 1, wherein the connecting ring comprises a major plane, wherein, in the mounted state of the chain, the major plane is essentially parallel to the tread.

13. The chain according to claim 1, wherein at least the first and second chain end links comprise an inside opening and a main plane, wherein the inside opening is configured to intersect the connecting ring, at an acute angle to the main plane of the respective chain link, wherein the angle has a value of 45 degrees±15 degrees.

14. The chain according to claim 1, wherein the connecting ring comprises a main plane, wherein, in the mounted state of the chain, the main plane of the connecting ring is essentially parallel to the tread, wherein at least one connecting ring, of the ring strand is cropped in comparison with the main plane of the ring, and the extent of the cropping can be predetermined.

15. The chain according to claim 1, wherein the connecting ring has an oval shape.

16. The chain according to claim 1, further comprising a shoulder chain section comprising a plurality of chain links, wherein at least a first chain link of the shoulder chain section is connected to the connecting ring and comprises a wear web.

* * * * *